United States Patent [19]

Hathaway

[11] Patent Number: 4,881,145
[45] Date of Patent: Nov. 14, 1989

[54] TAPE GUIDE MECHANISM

[75] Inventor: Mark A. Hathaway, Newark, Calif.

[73] Assignee: Ampex Corporation, Redwood City, Calif.

[21] Appl. No.: 36,762

[22] Filed: Apr. 10, 1987

[51] Int. Cl.$^4$ ............................................. G11B 15/60
[52] U.S. Cl. ................................................ 360/130.24
[58] Field of Search ................................... 360/130.24

[56] References Cited

U.S. PATENT DOCUMENTS 3,661,311  5/1972  Warren ........................... 360/130.24
4,048,661  9/1977  Staar ............................... 360/130.24

FOREIGN PATENT DOCUMENTS 2169433A  7/1986  United Kingdom ........... 360/130.24

Primary Examiner—A. J. Heinz
Attorney, Agent, or Firm—Harry G. Thibault; Richard P. Lange

[57] ABSTRACT

The improved tape guide mechanism includes a step in the surface of a scanning drum for a record/reproduce apparatus which moves an interface between a guide band of the apparatus and the surface of the scanning drum out of the tape path in a configuration which also minimizes tape buckling.

3 Claims, 2 Drawing Sheets

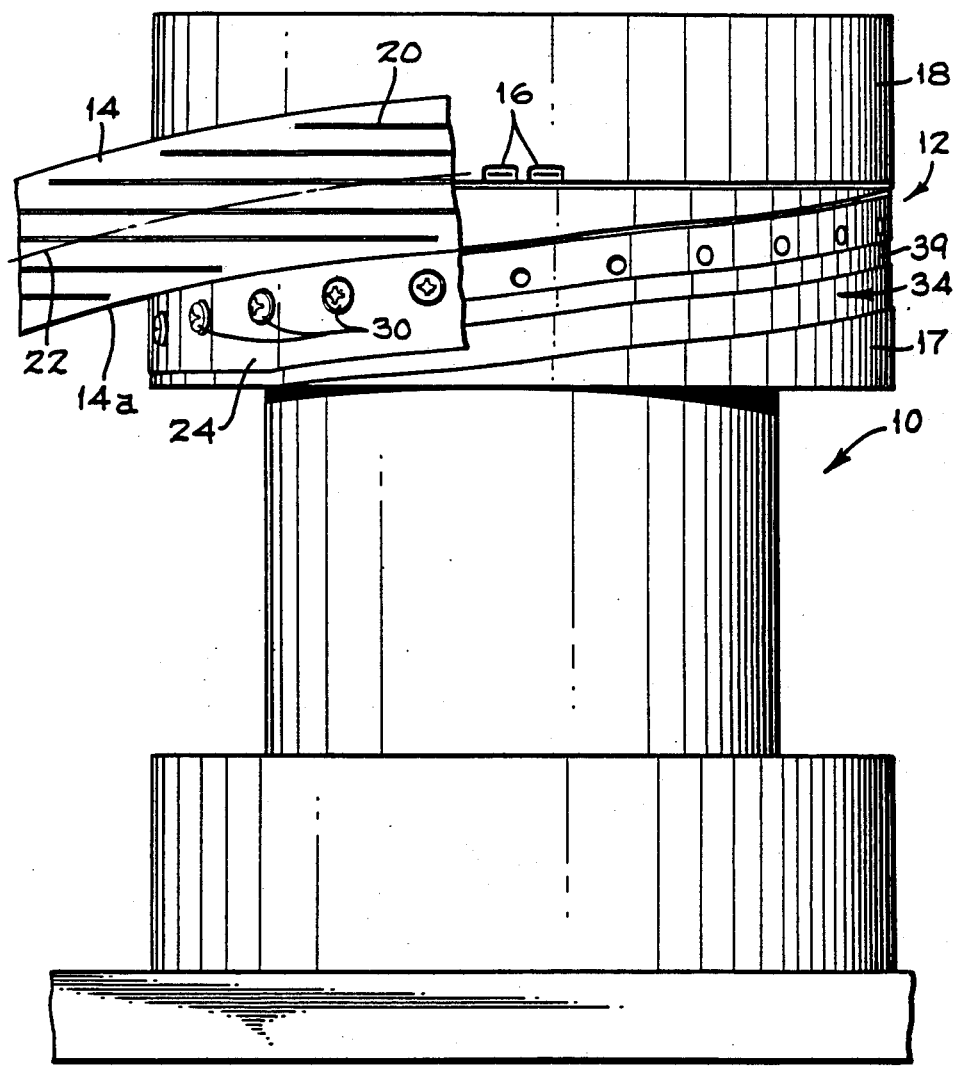
FIG_1

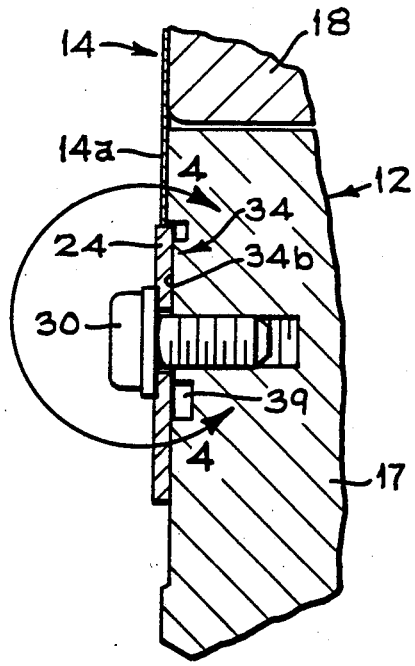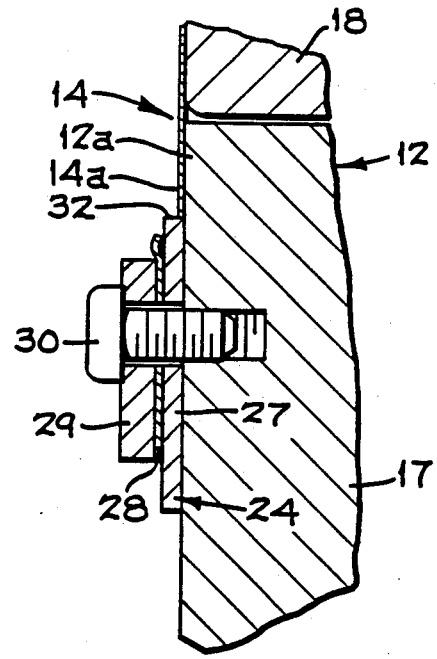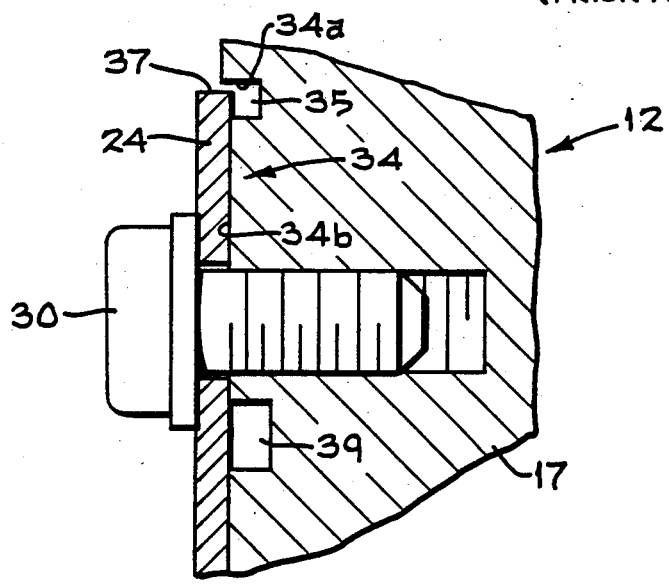

TAPE GUIDE MECHANISM

The present invention relates to a recording and reproducing apparatus for magnetic recording tape and in particular for a tape guide band for that apparatus.

In a recording/reproducing apparatus for magnetic record tape, an integral element of such apparatus is a two-piece, cylindrical scanning drum. A lower stationary section of the drum includes a tape guide positioned at the entrance of the tape to the drum. Depending on the data format and the apparatus configuration, one section of the drum rotates either counter to or in the direction of tape movement and contains one or more read/write heads which scan the tape at a rate which is normally much higher than the rate of linear tape movement. The apparatus moves the tape medium along a helical path for scanning; in such format the data tracks on the tape are positioned obliquely to the longitudinal axis of the tape, with the data tracks positioned to maximize the width of individual data tracks per width of tape. To align the data tracks of the tape with the heads in the scanning drum the tape must follow a helical path around the scanning drum. However, the provision of a helical tape guide around the scanning drum presents a unique problem to the manufacturer of such apparatus.

The most desirable configuration for a scanning drum is a smooth, machined drum surface contacting the tape face which can be simply processed to the degree of smoothness required for the particular magnetic recording tape application. In addition, the edge guide at the interface between the lower weight bearing edge of the tape and the weight bearing face of the tape guide should be of a hardened material to resist the wear generated by the tape edge moving against the guide. And with the advent of thinner tapes used in digital processing applications, it is necessary that the interface between the scanning drum and the tape guide prevents the tape from being trapped between the scanning drum and the tape guide to disrupt the flow of data to or from the tape.

In one known tape guiding apparatus the tape guide is a machined edge which results when a recess is machined into the face of the scanner drum to make the tape guide an integral part of the scanning drum. One disadvantage to the above solution is that the surface of the recess which is machined is also the surface across which the face of the tape moves, thereby limiting the ability of the user to modify that surface for optimum improvement relating to tape wear. Typically, the scanning drum is formed from a relatively soft material suitable for easily finishing the drum surface, such as polished aluminum. Such a material has certain low wear characteristics which make it unsuitable to provide a bearing and guiding surface for the weight bearing edge of the tape.

Moreover, another known tape guiding apparatus which places a more wear resistant surface at the weight bearing edge of the tape does not fully respond to the problem associated with the use of thin tapes. The guide band is formed of a hardened material for presenting a wear resistant surface to the edge of the tape, and then mounted directly on the scanning drum to avoid a machining step for the drum. The drum surface engaging the face of the tape is smooth and formed in a single machining process. However it is difficult to conform such a hardened material to the cylindrical surface of the drum since the material must be disposed on the drum surface angularly to provide a helical path to properly guide the tape past the scanning heads.

Accordingly, that hardened tape guide must be bolted tightly to the drum to assure that no gaps occur between the drum and the guide band. Earlier versions of this construction place at least one spring band and preferably both a spring band and a clamp band between the guide band and the plurality of screws used to fasten the guide band to the face of the scanning drum. Yet, for all of the clamping efforts attempted, there still exist gaps between the guide band and the scanning drum. Although such gaps may be acceptable with thicker tapes, it has been found that certain newer tapes which have particular applicability to digital applications are thin enough to slide between the gaps which occur when the guide band is attached to the surface of the scanning drum.

It is necessary to provide a guide band structure which eliminates the disadvantages of the known structures so as to provide a suitable structure usable with the thin tapes required in digital tape applications. Moreover, the tape must be sufficiently supported against the scanning drum surface to avoid tape buckling at the interface of the tape edge and the guide band. This means that there should be no appreciable gap between the scanning drum surface and the guide band edge on which the tape is supported.

Accordingly the construction of the present invention provides a step in the scanning drum surface, the step providing an undercut in the scanning drum adjacent the lower tape edge, and including a machined surface at the undercut which moves the inner face of the guide band out of the tape lie adjacent to the scanning drum along the face of the step, an upper face of the guide band to project outwardly therefrom to provide a tape bearing surface. Because the guide band is disposed partially in the step, there are no gaps at the upper face and therefore there is no need to apply clamping force to the guide band and therefore additional spring bands or clamping bands are eliminated from the proposed construction.

Having described the preferred embodiment of the invention, additional advantages should become readily apparent to the reader upon a consideration of the detailed description of the invention taken in conjunction with the drawings as described below.

BRIEF DESCRIPTION OF THE DRAWINGS

FIG. 1 is a perspective view of a scanning drum incorporating the improved guide band of the present invention;

FIG. 2 is a side elevation, shown partially in section, of the scanning drum and guide band configuration of FIG. 1;

FIG. 3 is a side elevation similar to FIG. 2, showing a prior art construction of a scanning drum and guide in combination; and FIG. 4 detail of FIG. 2 of the area enclosed by the circle designated 4—4 in FIG. 2.

DETAILED DESCRIPTION OF THE INVENTION

As shown in FIGS. 1 through 4, a head assembly 10 for a recording/reproducing apparatus includes a scanning drum 12 having a stationary portion 17 and a rotary portion 18. Magnetic recording tap 14, used by the apparatus 10 for the input/output of data, travels in a helical path around the scanning drum 12 to permit read/write heads 16 contained within the rotary portion 18 of the drum 12, to scan the tape 14. In the apparatus 10, rotary portion 18 rotates counter to the direction of the tape movement, to either read from or write on the tape 14. The rate and direction of scanner movement can vary from the rate and direction of tape movement, depending on apparatus and tape format. To maximize the width of the data tracks per width of the tape 14, data tracks 20 on the tape 14 are disposed obliquely to a longitudinal axis 22 of the tape 14. Accordingly, to align the data tracks 20 on the tape 14 with the scanning heads 16 on the scanning drum 12 it is necessary that the tape 14 traverse the drum 12 along a helical path.

Therefore, to assure that the tape 14 follows a helical path a tape guide band 24 is provided on the drum 12. As can be seen in FIG. 3, in the prior art, the form of the tape guide band 24 is such that the tape guide band 24 is mounted on the stationary portion 17, as opposed to the rotating portion 18, of the drum 12. The tape guide band 24 comprises a first band 27 of hardened material which is placed next to the smooth machined surface 12a of the drum 12. On top of the first band 27 is mounted a spring band 28 which cooperates with an additional clamping band 29 as well as a series of mounting screws 30 to push the first band 27 into as intimate contact with the smooth face 12a of the drum 12 as is possible in the prior art configuration.

However, it should be noted that at the interface 32 between the tape guiding edge 33 of the guide band 24 and the drum surface 12a gaps can occur which can trap a relatively thin tape 14 to disrupt its passage around the scanning drum 12 and to perhaps even tear or otherwise damage the tape 14.

Accordingly the present invention, shown in FIGS. 2 and 4, provides that a step 34 be machined into the face 12a of the scanning drum 12. Moreover, that step 34 should be an undercut which also provides machined corners 35 at the interface 36 between an upper face 34a and a side wall portion 34b of step 34 to provide a minimal radius thereat, to minimize the distance between an upper face 37 of the guide band 24 and the upper face 34a of the step 34. The guide band 24 extends outwardly from the step 34 and the upper guide band face 37 provides a tape bearing surface engaging the tape 14 at a lower edge 14a thereof.

The machining process used to provide the helical step 34 in the scanning drum 12 further requires that an interior portion 39 of the step 34 be cut away from the drum 12 during a preliminary machining step to avoid smearing of the machined material during the machining pass for the step 34; use of an end mill then provides a minimal radius at the machined corners 35 for the guide band 24, at opposite ends of the step 34, so that the relative position of the guide band 24 with respect to the drum surface 12a is generally parallel alignment. The guide band 24 is precisely formed to define its helical path; and its placement on the scanning drums 12 is equally critical. In the machining of the undercut step 34 in the drum, it is not necessary to assure that the upper face 37 of the guide band 24 abut the upper face 34a of the step 34 continuously along the interface thereof. The machined corners 35 of the step 34 allow the face 37 of the guide band 24 to be mounted closely adjacent to the face 34a of the step 34, to minimize the distance between the face 34a and the guide band 24, thereby to minimize the possibility of columnar tape buckling at that interface.

Since the guide band 24 rests in the step 34 and the gap between guide band 24 and the drum surface 12a has been moved out of the tape path, it is no longer necessary to require that spring bands 28 and/or clamp bands 29 be used to clamp the guide band 24 to the face 12a of the drum 12. Accordingly, a simple series of mounting screws 30 can be used to fasten the guide band 24 to the side wall 34b of the step 34 in the drum 12.

Having described one form of the invention it should be readily apparent that further embodiments and other modifications can be possible. Accordingly, it is not intended that the present invention be restricted to the description set forth above but rather that any limitations to the invention be set forth in the appended claims.

What is claimed is:

1. In a head assembly for a recording and reproducing apparatus for the storage and retrieval of information on a tape medium, including a cylindrical drum to position the tape medium for movement on a path defined on a tape-bearing surface of the drum, a guide mechanism tracing said path on the drum surface, said guide mechanism comprising:

an inwardly directed step formed in the tape-bearing surface of the drum, said step having an upper face and including a second recessed channel portion disposed contiguous to the upper face, said step following said path of the tape medium; and a guide band mounted on the drum to define the position of the tape path around the drum, an upper face of the guide band received in the second recessed channel portion of the step, to be disposed adjacent the upper face of the step, to be provided a shelf which supports the tape medium at a lower edge thereof, and to minimize gaps between the guide band and the step, thereby to prevent the tape medium from being trapped between the guide band and the drum surface, as the tape medium moves along said guide band, and to fully support the tape medium both on the guide band and at the drum surface.

2. In a head assembly for a recording and reproducing apparatus for the storage and retrieval of information on a tape medium, including an input/output mechanism interposed between the tape medium and said apparatus, and a cylindrical drum to position the tape medium for movement on a helical path defined on a tape-bearing surface of the drum, for scanning by record/reproduce reproduce elements provided within the drum, a guide mechanism tracing the helical path on the drum surface, said guide mechanism comprising:

an inwardly directed step formed in the tape-bearing surface of the drum, said step having an upper face and including a second recessed channel portion disposed contiguous to the upper face, said step following the helical path of the tape medium; and a guide band mounted on the drum to define the position of the tape path around the drum, an upper face of the guide band received in the second recessed channel portion of the step, to be disposed adjacent the upper face of the step, to protrude outwardly from the drum to provide a shelf which supports the tape medium at a lower edge thereof, and to minimize gaps between the guide band the step, thereby to prevent the tape medium from being trapped between the guide band and the drum surface, as the tape medium moves along said guide band, and to fully support the tape medium both on the guide band and at the drum surface.

3. In a recording and reproducing apparatus for the storage and retrieval of information on a tape medium, a method for position the tape medium for movement on a path defined on a tape-bearing surface of the drum, said method comprising:

forming an inwardly directed step in the tape-bearing surface of the drum;

defining an upper face of the step and a second recessed channel portion of the step disposed contiguous to the upper face, said step following said path of the tape medium; and mounting a guide band on the drum to define the position on the tape path around the drum; and disposing an upper face of the guide band in the second recessed channel portion and adjacent the upper face of the step to provide a shelf which supports the tape medium at a lower edge thereof, to minimize gaps between the guide band and the step, thereby to prevent the tape medium from being trapped between the guide band the drum surface, as the tape medium moves along said guide band, and to fully support the tape medium both on the guide band and at the drum surface.

* * * * *